Figure 3:
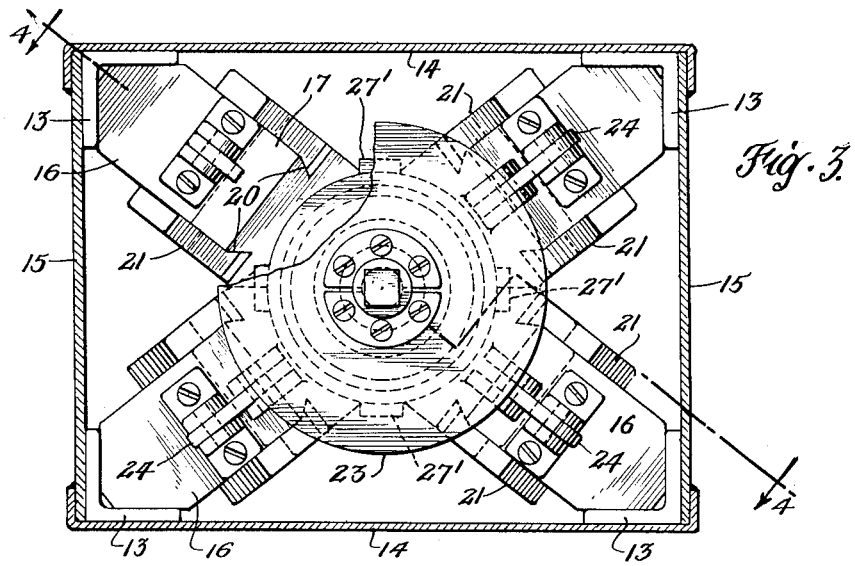

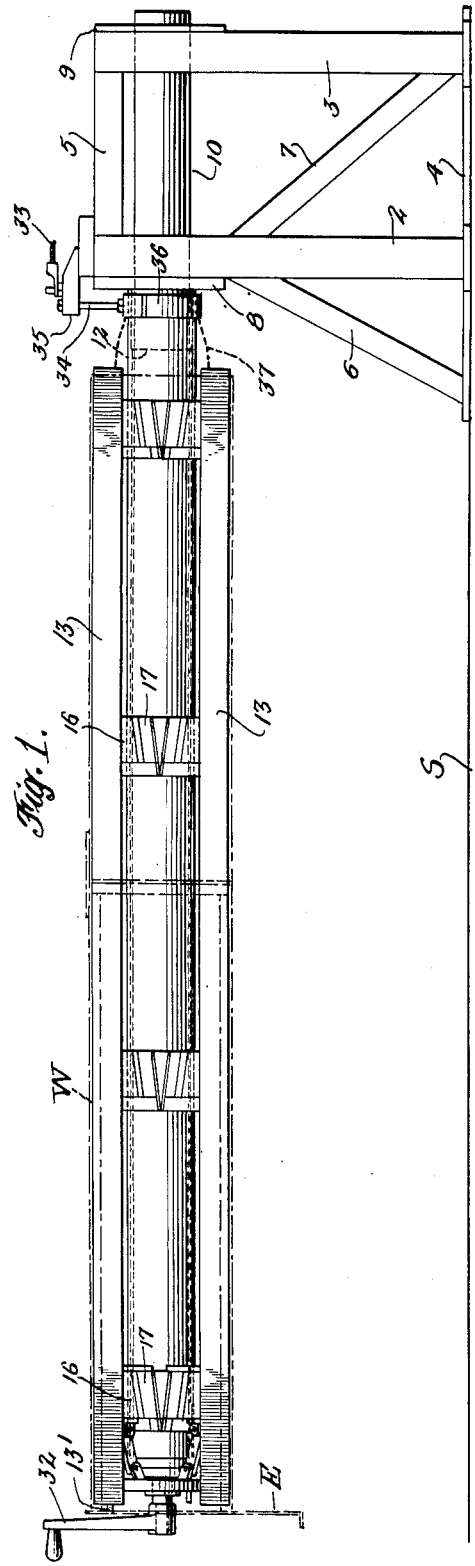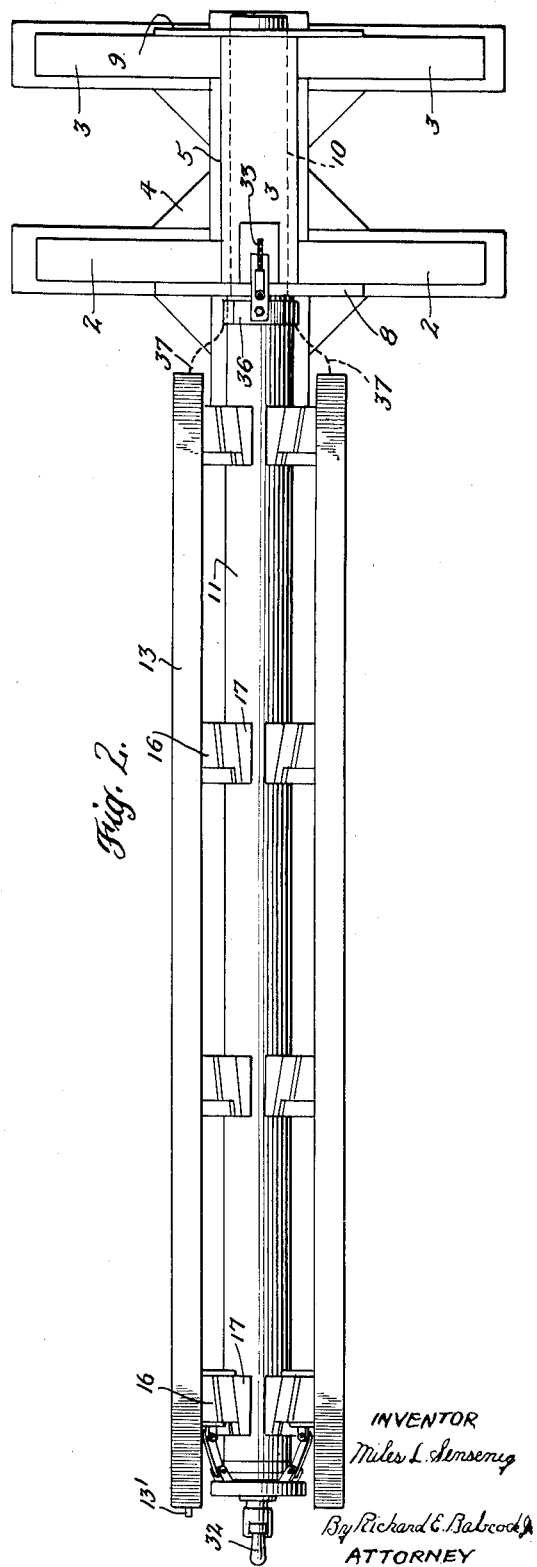

Feb. 7, 1956 M. L. SENSENIG 2,734,120
EXPANSIBLE AND CONTRACTIBLE WELDING JIG
Filed Oct. 5, 1953 2 Sheets-Sheet 2

INVENTOR
Miles L. Sensenig
By Richard E. Babcock Jr.
ATTORNEY

United States Patent Office 2,734,120
Patented Feb. 7, 1956

2,734,120

EXPANSIBLE AND CONTRACTIBLE WELDING JIG

Miles L. Sensenig, Lancaster, Pa., assignor, by mesne assignments, to Sperry Rand Corporation, New Holland, Pa., a corporation of Delaware Application October 5, 1953, Serial No. 384,001

1 Claim. (Cl. 219—17)

This invention relates to an expansible and contractible welding jig which is primarily intended for use in supporting the various top, bottom and side plates while same are welded together on said jig to form a bale casing of rectangular or other polygonal cross-section. However, the welding jig of the invention is by no means limited to this specific use, but may be easily adapted for use in connection with the assembling and welding together of the several component parts of any tubular structure.

It is a primary object of the invention to provide such a jig in which the several parts are arranged in a novel manner to permit expansion or contraction of the jig as may be desired to permit the proper formation of a bale case or other tubular structure on the jig and thereafter to facilitate the removal of such structure from the jig. To this end a plurality of jig elements carried by a central hub member are disposed for longitudinal movement relative to the hub member and are so connected to the hub member that such longitudinal movement will result in movement of these elements transversely toward or away from the hub member. A simplified actuating mechanism is provided for simultaneously longitudinally moving such jig elements relative to their supporting hub member to cause expansion or contraction of the jig.

An important feature of the invention consists in mounting the aforesaid jig in cantilever fashion with the jig supported at one end only, the other end being free and unsupported to permit longitudinal removal of the completed work pieces therefrom.

A further feature consists in freely rotatably supporting the jig to facilitate access to any portion of the work piece thereon.

A further feature consists in so disposing the actuating means for the said jig elements that such means or mechanism may be operated to cause expansion or contraction of the jig in any of its rotational positions. To this end the hub or hub member of the jig and the several jig elements are each connected to the actuating means and the latter functions to exert longitudinal or axial forces between the hub and the respective jig elements.

A further feature consists in providing means for grounding one terminal of the welding equipment to the respective jig elements in such manner as to maintain an operative connection between said terminal and the said jig elements in all positions of said elements relative to the hub and throughout all rotational positions of the jig.

Figure 4:
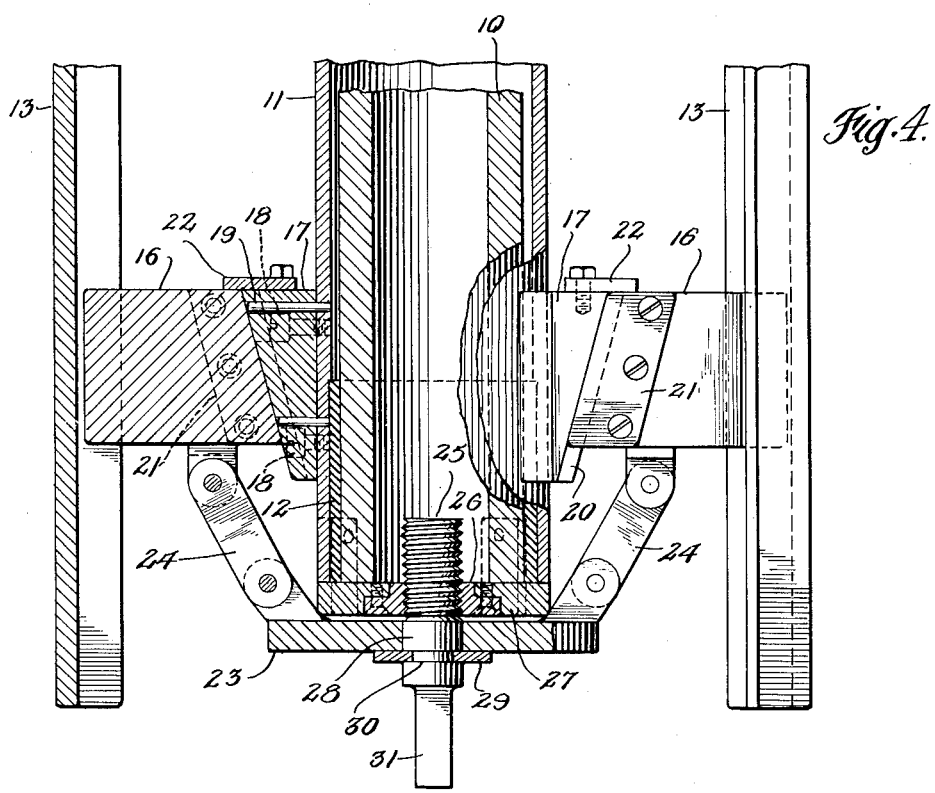

The foregoing objects, features and advantages are all attained in the preferred embodiment of the invention illustrated in the accompanying drawings in which:

Figure 1 represents a side elevation of a welding jig in accordance with the invention, the jig being in expanded condition with a completed bale casing (indicated in dot and dash lines) operatively positioned thereon;

Figure 2 a plan view of Figure 1;

Figure 3 an enlarged end view looking toward the right in Figure 1 with a portion of the view broken away and with the bale casing shown in cross-section; and, Figure 4 a plan cross-section of Figure 3 taken substantially on the line 4—4.

Referring now in detail to the accompanying drawings, the supporting frame or stand for the jig there shown comprises relatively longitudinally spaced pairs 2—2 and 3—3 of upwardly converging legs supported on a base 4 and interconnected at their upper ends by a longitudinally extending frame member 5. If desired, suitable diagonal braces 6 and 7 may be utilized to lend rigidity to the frame structure. Obviously, these several frame members may be of conventional channel iron construction or the like and may be welded or otherwise rigidly interconnected.

A pair of relatively longitudinally spaced transverse plates 8 and 9 fixed to and supported between the respective legs 2—2 and 3—3 are apertured to receive the end portion of a dead shaft 10 which is fixed therein in any suitable manner as by welding. It will be seen that this shaft 10, which may be tubular if desired, is rigidly supported on the stand in cantilever fashion with a longitudinally projecting free end. In order to prevent overbalancing of the structure by this horizontally projecting free end, and the parts carried thereby as hereinafter mentioned, the base 4 may be suitably anchored or otherwise fixed to its supporting surface S.

The foregoing stand and dead shaft 10 merely exemplify one suitable means for rotatably supporting the jig structure of the invention in such manner that one end of such jig structure may be free to permit longitudinal removal of a bale casing or other tubular structure formed on the jig.

The jig structure comprises a preferably tubular hub or hub element 11 rotatably supported on the shaft 10 preferably by means of bushings 12—12 (Figures 1 and 4) secured internally of the hub 11 at its opposite end portions and rotatably journalled on dead shaft 10, as best illustrated in Figure 4 of the drawings. Supported on this hub or hub element 11 for rotation therewith are radially retractible and expandable jig elements 13 which in the present case comprise usual angle iron members disposed to define the four corners of the bale casings or work pieces W which are to be formed and welded on the jig. It will be seen that the side, top and bottom members 14—14 and 15—15 respectively of a bale casing W or other tubular structure may be positioned on the respective angle iron members or jig elements 13 in the expanded condition of the jig and welded together to form the completed bale casing or tubular structure. Thereafter, in order to be able to easily remove the completed tubular structure from the jig it is desirable that the members or elements 13 be radially inwardly retractible toward the axis of the hub or hub element 11.

For this reason each of the jig elements 13 is supported on one or more slides or slide portions 16 fixed to each such jig element 13, each of these slides 16 being guided for axial movement on an axially inclined trackway 17 fixed on the hub 11 as by the bolts 18 and positioning pins 19 shown in Figure 4. By reference to Figure 3 it will be seen that each of the trackways 17 is provided with laterally oppositely directed undercut edge portions 20 beneath which project the lower edge portions of guide plates 21—21 bolted or otherwise fixed on the opposite sides of the respective slides 16, as best illustrated in Figure 4. The dove-tailed type interconnection thus formed between the slides 16 and trackways 17 serves to maintain the slides 16 in operative engagement with the axially inclined faces of the trackways 16 at all times, even though some of the slides 16 will be disposed beneath and depend from their respective trackways 17.

Since the expanded dimensions of the jig will determine the cross-sectional dimensions of the tubular bale casings or other elements formed on the jig it is desirable to provide some means for repeatedly positioning the respective jig elements 13 in the same predetermined position of maximum expansion, thus to secure uniformity in the cross-sectional dimensions of the tubular elements formed on the jig. For this purpose, I prefer to utilize limit plates or stops 22 bolted or otherwise secured on the respective trackways 17 in alignment with the axially inclined surface of each such trackway to engage and limit the expansive movement of each slide 16 along its respective trackway.

It will be seen that in the preferred embodiment of the invention the hub element 11 has fixed thereon a plurality of sets of axially aligned and similarly axially inclined trackways 17 each such set of trackways 17 being disposed for cooperation with a set comprising a similar plurality of slides 16 carried by one of the jig elements 13.

From the foregoing it will be apparent that longitudinal or axial movement of the jig elements 13 will also cause radial movement of said elements relative to the rotational axis of the hub 11. In accordance with the invention means or mechanism is provided for causing simultaneous axial movement of said elements 13, said means or mechanism preferably interconnecting the several jig elements 13 to the hub element or member 11 and being operative to cause relative axial movement between said jig elements and the hub element in any of the rotational positions which might be assumed by the jig.

A suitable actuating means for accomplishing this function is illustrated in detail in Figure 4. Such means preferably comprises a cross-head 23 connected by links 24 to the respective jig elements 13, preferably through their respective adjoining slides 16, the cross-head 23 being in substantial axial alignment with the hub or hub element 11. Means for axially moving the cross-head 23 relative to the hub 11 may assume varying forms though I prefer to employ an actuating screw 25 threaded through a nut or insert 26 fixed in a cap 27 secured on the end of the hub 11 and constituting a portion thereof. By reference to Figures 3 and 4 it will be seen that the cap 27 is provided with a plurality of axially extending ears 27' which extend exteriorly of and are bolted to hub 11. The screw 25 is provided with a cylindrical portion 28 freely rotatable through the cross-head 23 and an annular plate 29 fixed on the cross-head 23 coaxially about the screw 25 has its inner periphery rotatably received in a groove 30 in the cylindrical portion 28 of the screw to cause the cross-head 23 to move axially with the screw. In the instant embodiment the screw 25 is provided with a square cross-sectional shank 31 adapted for reception in the similarly shaped socket of a crank member 32 shown in Figures 1 and 2. It will be seen that rotation of the screw 25 responsive to manual actuation of the crank 32 will cause relative axial movement between the cross-head 23 and the hub 11 in either direction, depending on the direction of rotation of the screw 25, whereby the jig may be selectively expanded or contracted as desired.

Where the jig is used for forming bale cases for hay balers, this being the preferred usage for which the instant invention is adapted, the usual end plate E (see Figure 1 of the drawings) of the bale casing W is provided with a usual drive shaft receiving opening (not shown in the drawings) for reception of the screw shank 31 and the socketed hub portion of the crank 32. Also, if desired certain of the jig elements 13 may be provided with longitudinally projecting positioning pins 13' for cooperation in usual manner with the end plate E, as in Figure 1.

In the operation of the invention with the several jig elements 13 radially outwardly projected to the full extent permitted by the stops 22, to thus place the jig in expanded condition, the several separate side plates 15—15, top and bottom plates 14—14 and end plate E to be assembled as part of the bale casing W are supported on the jig in their relatively assembled positions as shown in Figures 1 and 3 and clamped or otherwise temporarily secured to their respectivve jig elements 13 preparatory to the welding operation. Thereupon the adjoining portions of these several plates may be electrically welded to each other in conventional manner, following which the clamps may be removed and the tubular bale casing thus formed then removed from the jig.

In order to facilitate this electrical welding operation, one terminal of the welding apparatus may be grounded to the jig through a conductor 33 connected electrically to a usual brush 34 carried by a bracket 35 on the jig frame in operative wiping engagement with a conductor ring 36 which is fixed on and rotates with the hub 11. This conductor ring 36 is electrically connected with each of the jig elements 13 by means of flexible cables 37 illustrated diagrammatically in broken lines in Figures 1 and 2, these flexible cables permitting free expansion and contraction of the respective jig elements 13 without interrupting the electrical connections thereof with the conductor ring 36.

Upon completion of the welding operation on the several component parts of the bale casing W when it is desired to remove the completed bale casing W as a unit from the jig, the removable crank 32 is applied to the shank 31 of the jig and mutually rotated to draw the respective jig elements 13 toward the left in Figure 1 and thus radially inwardly to retracted position, whereby the jig fits loosely within considerable clearance within the bale casing and the latter may be freely longitudinally withdrawn or removed toward the left in Figure 1 off of the free end of the jig.

Such removal may be accomplished manually or in any other manner desired, though for this purpose I prefer to utilize the portable supporting dolly which is shown and described in my separate application filed concurrently herewith.

In this application, I have shown and described only the preferred exemplification of the invention, simply by way of setting forth the preferred mode contemplated by me of carrying out the invention. However, I recognize that the invention and various of the elements thereof may be modified in a number of ways, all without departing from the invention. Accordingly, the foregoing drawings and description are to be considered as merely illustrative in nature and not as exclusive.

Having thus described my invention, I claim:

An assembling and welding jig for articles of polygonal cross-section comprising a stand, a free ended dead shaft mounted on said stand, a tubular hub element rotatable on said shaft, a plurality of sets of similarly axially inclined trackways fixed on said hub element, all of said track-ways being similarly radially and axially inclined to the rotational axis of the hub element and the trackways of each said set being relatively axially spaced apart, a similar plurality of radially retractible and expansible axially extending jig elements, each said element including sets of relatively axially spaced slides fixed thereto and respectively guided for axial movement in the trackways of one of said sets of trackways, whereby axial movement of said jig elements will also cause radial movement thereof relative to the rotational axis of said hub element, and means for causing simultaneous axial movement of said elements comprising, a cross-head axially aligned with said hub element, means guiding said cross-head for axial movement relative to said hub element, links connecting said cross-head to the respective jig elements, and threaded means connecting said cross-head to said hub element and operative to cause axial movement of the cross-head relative to the hub element.

References Cited in the file of this patent

UNITED STATES PATENTS

| | | |
|---|---|---|
| 1,696,455 | Rupley | Dec. 25, 1928 |
| 2,460,325 | Whitson | Feb. 1, 1949 |
| 2,515,786 | Mitchell | July 18, 1950 |
| 2,596,453 | Weidel | May 13, 1952 |
| 2,664,843 | Turner | Jan. 5, 1954 |